(12) United States Patent
Pramann et al.

(10) Patent No.: US 11,642,741 B2
(45) Date of Patent: May 9, 2023

(54) SYSTEM FOR TREATING MATERIAL OF A CUTTING ELEMENT

(71) Applicant: KOOIMA AG, Rock Valley, IA (US)

(72) Inventors: Zachary T. Pramann, Beresford, SD (US); Thad M. De Jager, Rock Valley, IA (US); Phil Kooima, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 245 days.

(21) Appl. No.: 16/848,427

(22) Filed: Apr. 14, 2020

(65) Prior Publication Data

US 2021/0316397 A1 Oct. 14, 2021

(51) Int. Cl.
| | |
|---|---|
| *B23K 26/342* | (2014.01) |
| *C21D 9/22* | (2006.01) |
| *B23K 26/00* | (2014.01) |
| *B23K 26/082* | (2014.01) |
| *B24B 3/36* | (2006.01) |
| *B23K 26/06* | (2014.01) |

(52) U.S. Cl.
CPC ........ *B23K 26/342* (2015.10); *B23K 26/0006* (2013.01); *B23K 26/0626* (2013.01); *B23K 26/082* (2015.10); *B24B 3/36* (2013.01); *C21D 9/22* (2013.01); *C21D 2211/008* (2013.01)

(58) Field of Classification Search
CPC .. B26B 9/00; B26B 9/02; B26B 21/58; B26D 2001/002; B26D 2001/0053
See application file for complete search history.

(56) References Cited

U.S. PATENT DOCUMENTS

| | | | |
|---|---|---|---|
| 2002/0088122 A1* | 7/2002 | Zuidervaart | B26B 21/4031 30/34.2 |
| 2012/0060379 A1* | 3/2012 | Culf | B26B 9/00 30/350 |
| 2014/0090537 A1* | 4/2014 | Campbell | B23D 61/126 83/854 |
| 2019/0055632 A1* | 2/2019 | Chinella | C22C 38/30 |
| 2019/0210150 A1* | 7/2019 | Wang | B23D 65/00 |

* cited by examiner

*Primary Examiner* — Thien S Tran
(74) *Attorney, Agent, or Firm* — Jeffrey A. Proehl; Woods, Fuller, Shultz & Smith, PC

(57) ABSTRACT

A system for treating material of a cutting element may include a method, and the method may include providing a piece of material to form a blank for the cutting element, and applying a cladding material to at least a portion of the blank utilizing a laser to bond a cladding powder to the exterior surface of the blank. The application may include selecting and utilizing a power level of the laser and a rate of movement of the spot of the laser across the exterior surface which is effective to form a stratum of martensite in the substrate of the material below the exterior surface and the cladding material bonded to the exterior surface. The method may further include removing a portion of the cladded blank to form a cutting edge with a portion of the stratum of martensite exposed at the cutting edge.

16 Claims, 10 Drawing Sheets

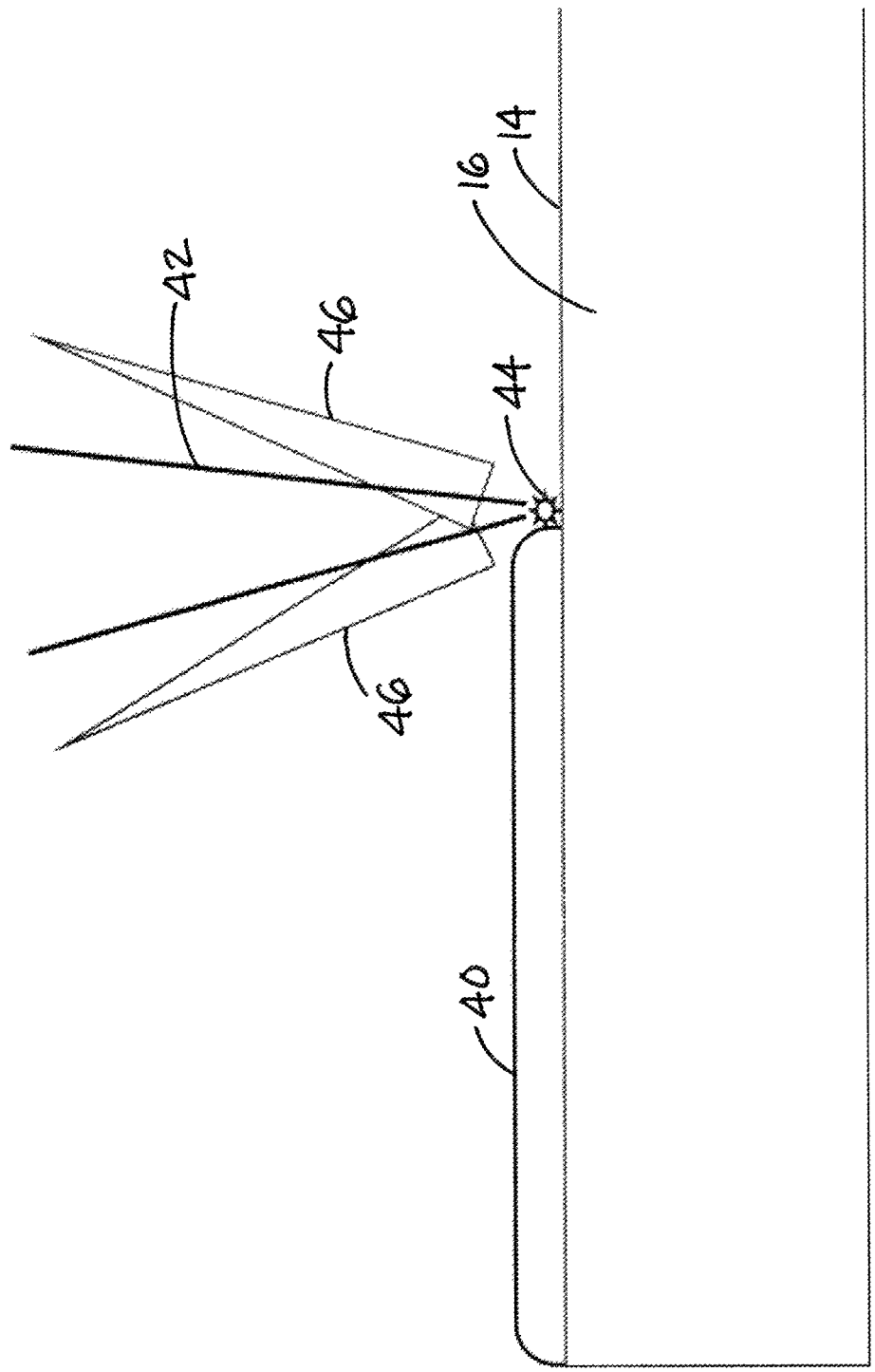

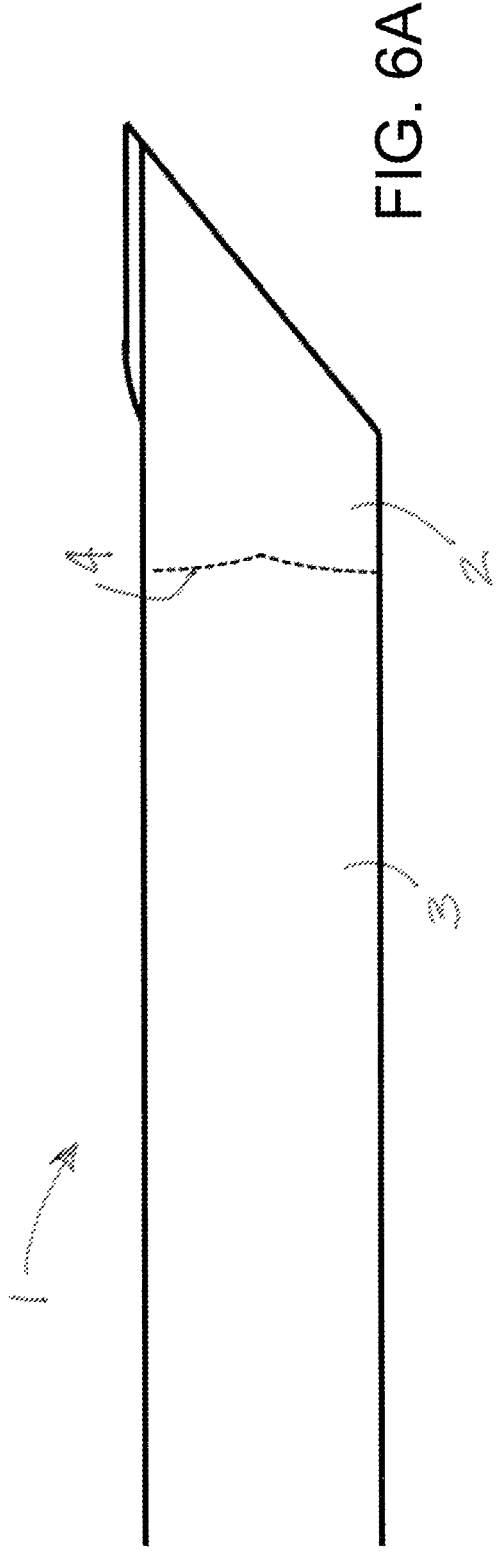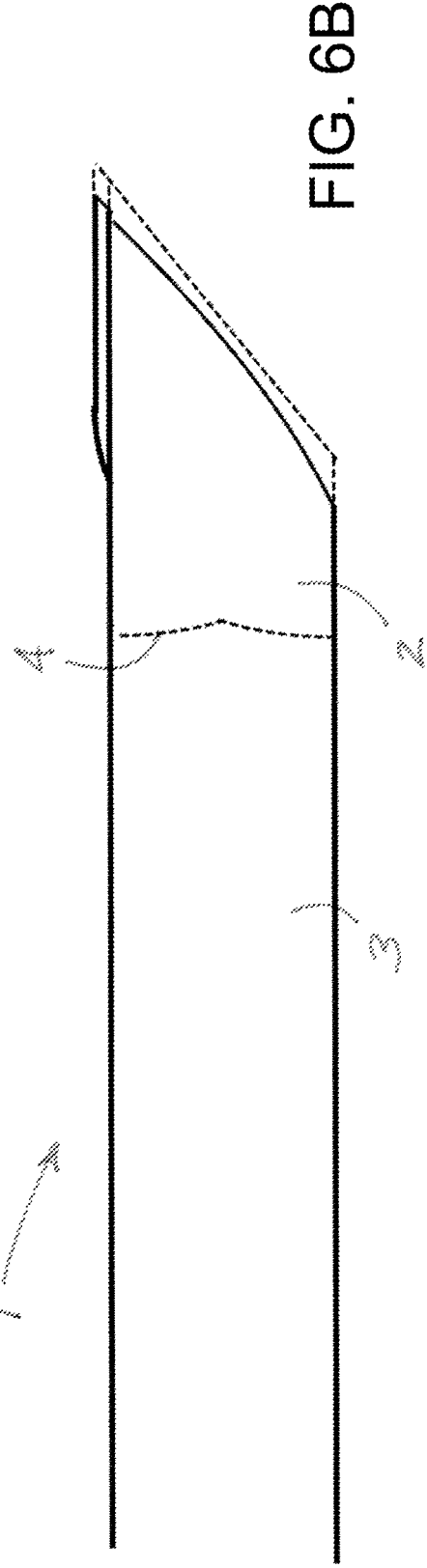

SYSTEM FOR TREATING MATERIAL OF A CUTTING ELEMENT

BACKGROUND

Field

The present disclosure relates to heat treatment of wear items and more particularly pertains to a new system for treating material of a cutting element.

SUMMARY

In one aspect, the present disclosure relates to a method of treating material of a cutting element. The method may include providing a piece of material to form a blank for the cutting element, with the blank having an exterior surface and a substrate of the material below the exterior surface of the blank. The method may further include applying a cladding material to at least a portion of the blank utilizing a laser to bond a cladding powder to the exterior surface of the blank, with a beam of the laser impinging on the exterior surface of the blank at a spot on the exterior surface. The application may include selecting and utilizing a power level of the laser and a rate of movement of the spot of the laser across the exterior surface which is effective to form a stratum of martensite in the substrate of the material below the exterior surface and the cladding material bonded to the exterior surface. The method may further include removing a portion of the blank to form a cutting edge on the cutting element with a portion of the stratum of martensite exposed at the cutting edge.

In some implementations of the method, the power level of the laser beam may be effective to create, at a location on the blank, heating of the material to induce a phase change that results in the formation of the stratum of martensite in the substrate of the material below the exterior surface and the cladding material bonded to the exterior surface In some implementations of the method, the rate of movement of the spot of the laser beam across the exterior surface of the blank may be effective to create, at the location on the blank, cooling of the material to quench the material at the location to create the stratum of martensite in the substrate of the material below the exterior surface and the cladding material bonded to the exterior surface.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 4 is a schematic side sectional view of elements of the system during a cladding process, according to an illustrative embodiment.

FIG. 6A is a schematic side sectional view of a cutting element formed by previously utilized techniques and is shown in a typical condition prior to wear on the element.

FIG. 6B is a schematic side sectional view of the cutting element formed by previously utilized techniques and is shown in a typical condition after experiencing a degree of wear after usage of the element.

DETAILED DESCRIPTION

With reference now to the drawings, and in particular to FIGS. 1 through 8 thereof, a new system for treating material of a cutting element embodying the principles and concepts of the disclosed subject matter will be described.

The applicants have recognized that the production of some parts, such as cutting elements utilized to mount on an apparatus for cutting or otherwise cleaving matter into smaller pieces by the movement of the cutting element against the matter, utilize techniques that are intended to increase the usable life of the cutting element and thus reduce the need to remove the cutting element from the apparatus and mount a new cutting element on the apparatus. Production techniques for parts such as cutting elements tend to be a compromise between steps taken to enhance the hardness (e.g., resistance to wear) of the region of the cutting element typically subjected to the greatest degree of wear during use, such as the cutting edge region, while also enhancing the toughness (e.g., resistance to fracture) of the regions of the cutting element outside of the cutting edge region. The degree of hardness desirable in the cutting edge region, if extended to the entire cutting element, would tend to make the region beyond the cutting edge region too brittle and vulnerable to fracture before wear on the cutting edge would end the useful life of the cutting element.

Figure 1A:
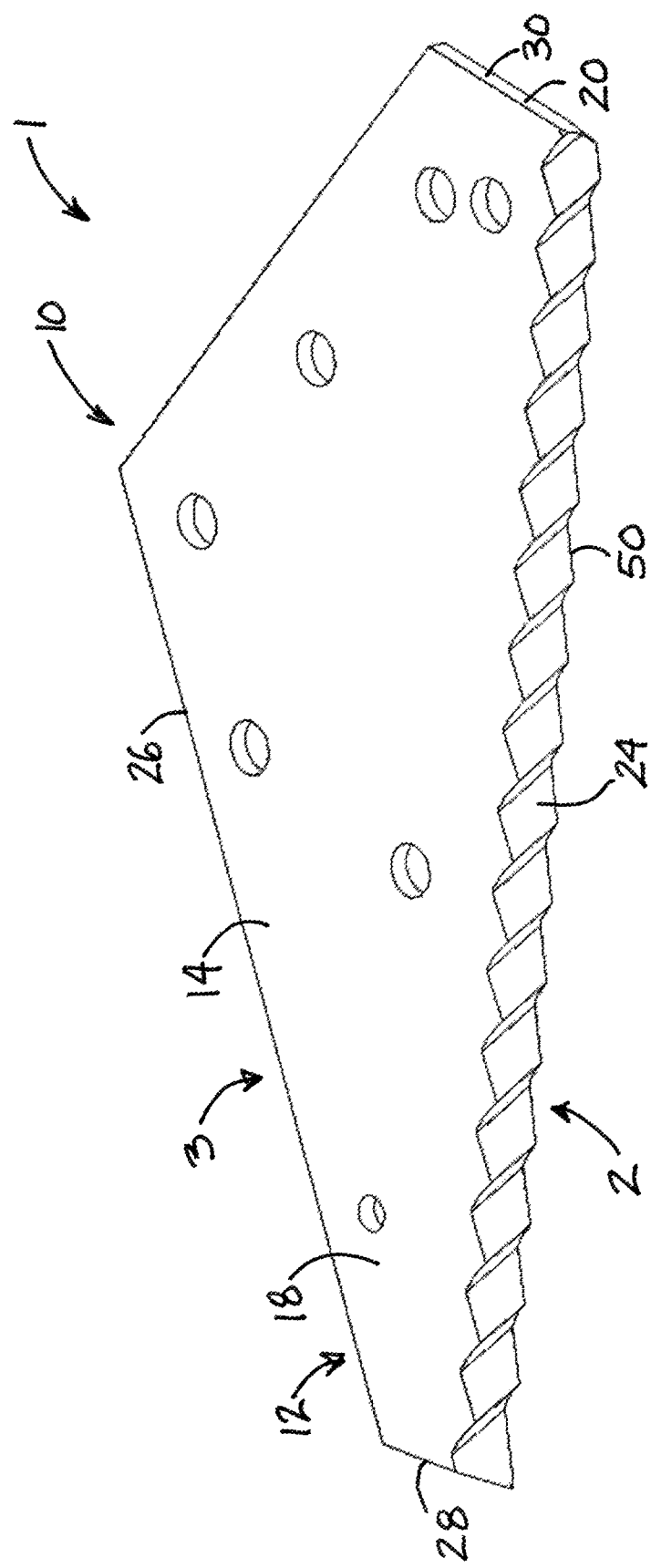
FIG. 1A is a schematic first perspective view of an illustrative embodiment of a cutting element formed according to an illustrative method of the present disclosure.
Figure 1B:
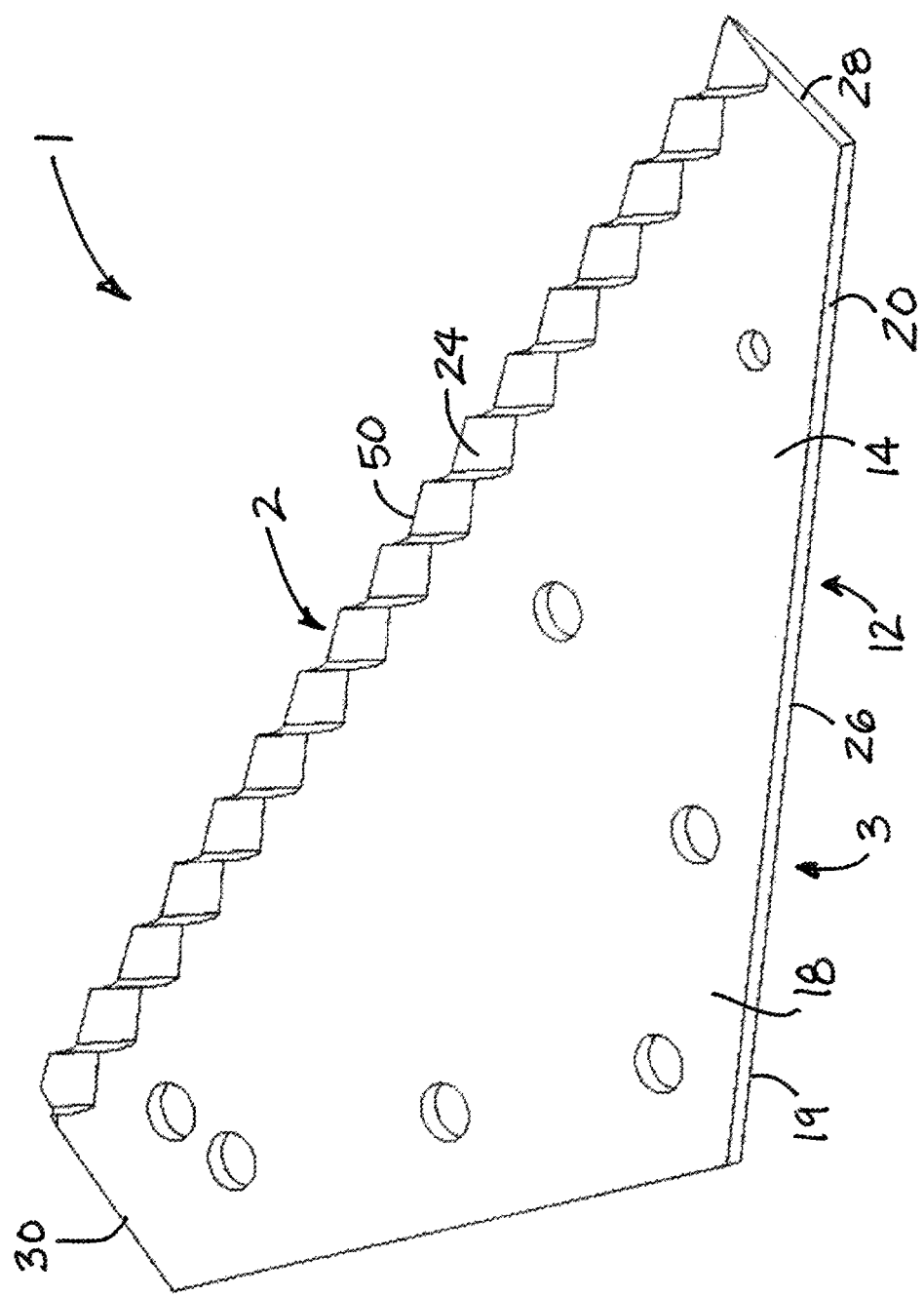
FIG. 1B is a schematic second perspective view of the illustrative embodiment of the cutting element of FIG. 1A formed according to the illustrative method of the present disclosure.
Figure 2:
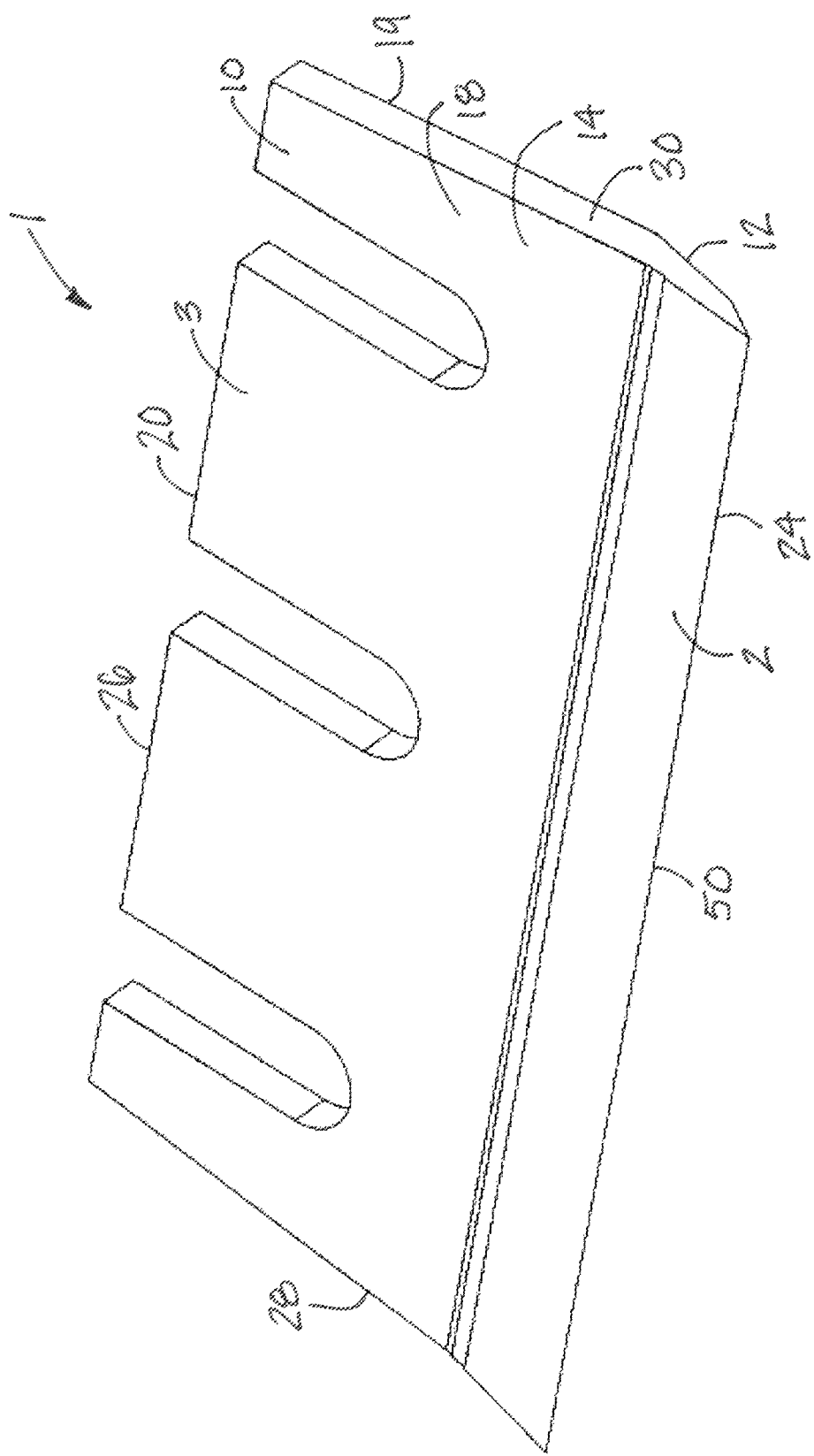
FIG. 2 is a schematic perspective view of another illustrative embodiment of a cutting element formed according to an illustrative method of the present disclosure.
Figure 3:
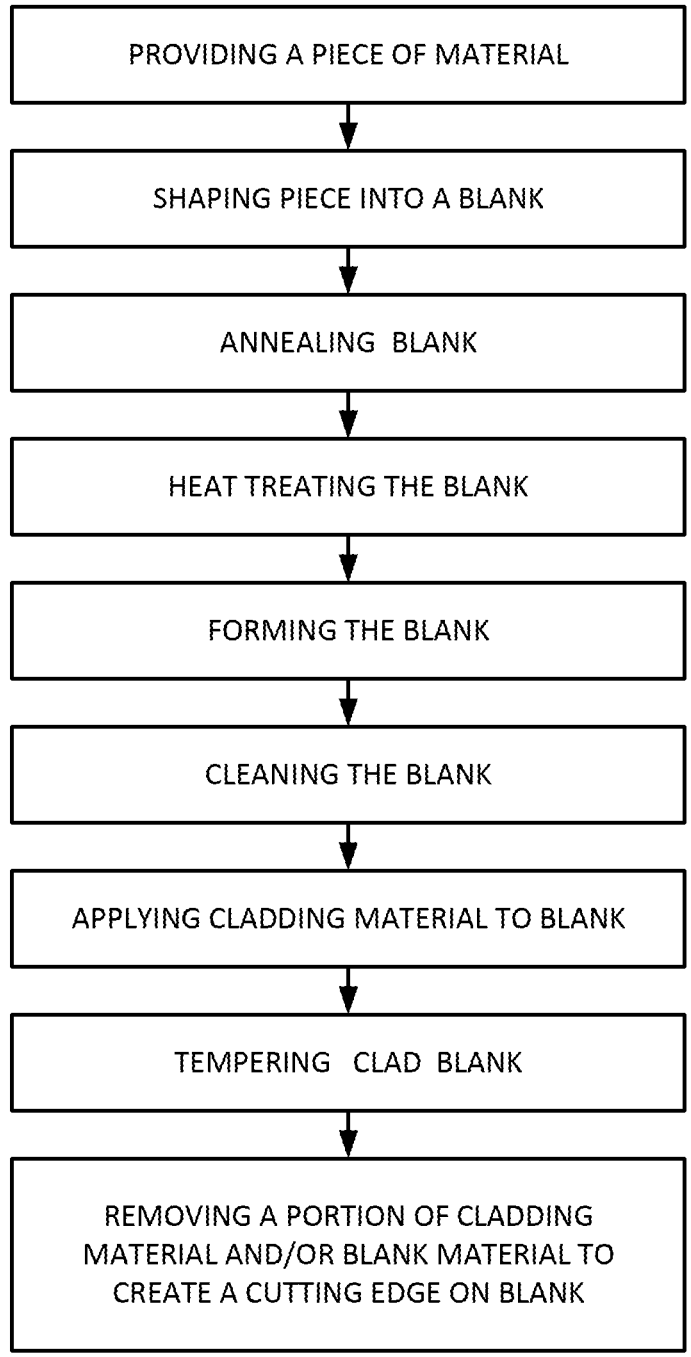
FIG. 3 is a schematic flow diagram of an illustrative implementation of a method of the disclosure.
Figure 5A:
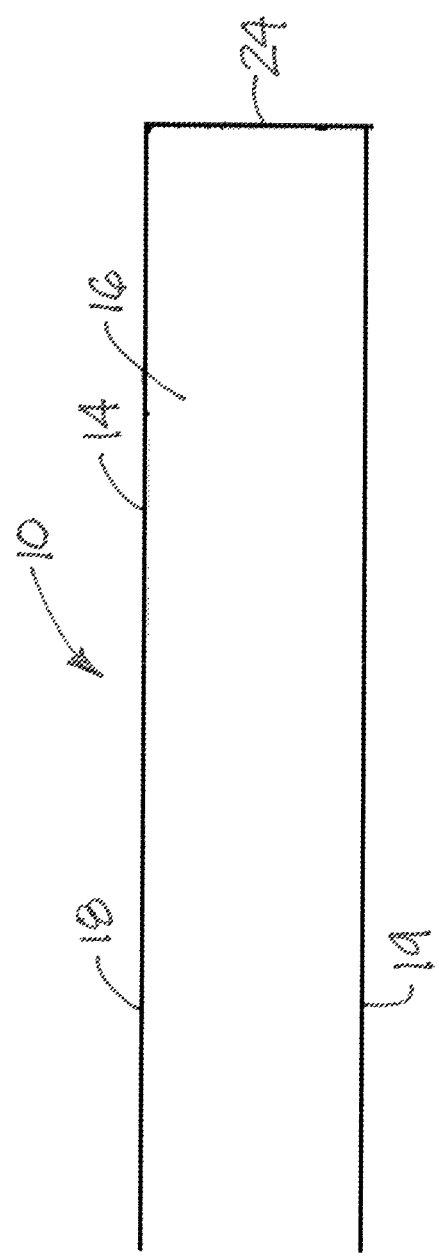
FIG. 5A is a schematic side sectional view of a blank for forming the cutting element prior to application of cladding material according to an implementation of a method of the disclosure.
Figure 5B:
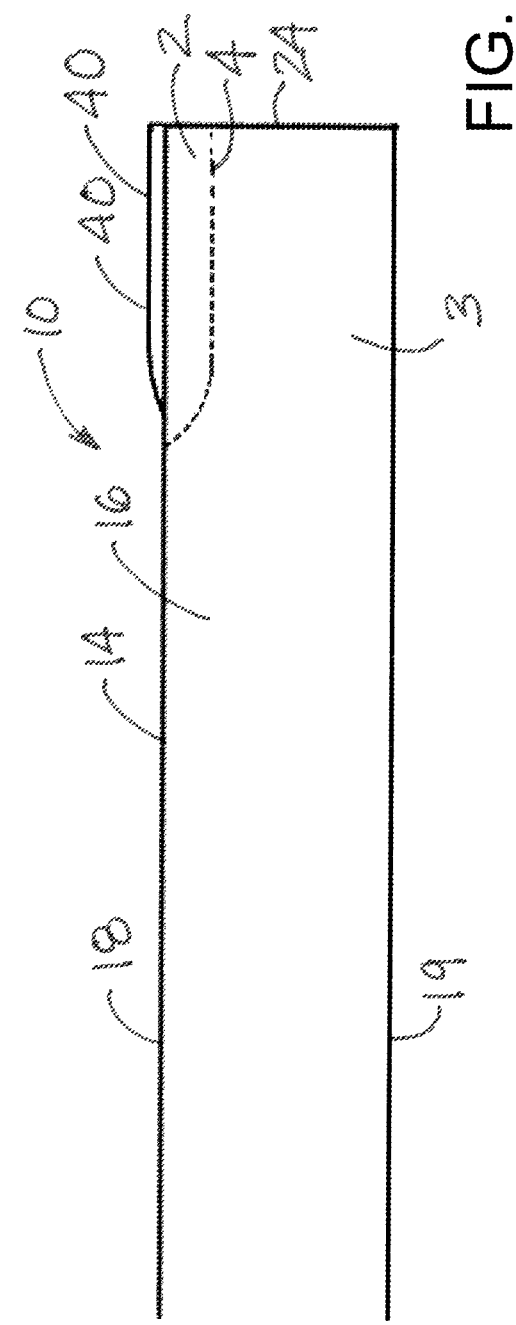
FIG. 5B is a schematic side sectional view of a blank for forming the cutting element after application of cladding material but prior to removal of material to form a cutting edge, according to an implementation of a method of the disclosure.
Figure 5C:
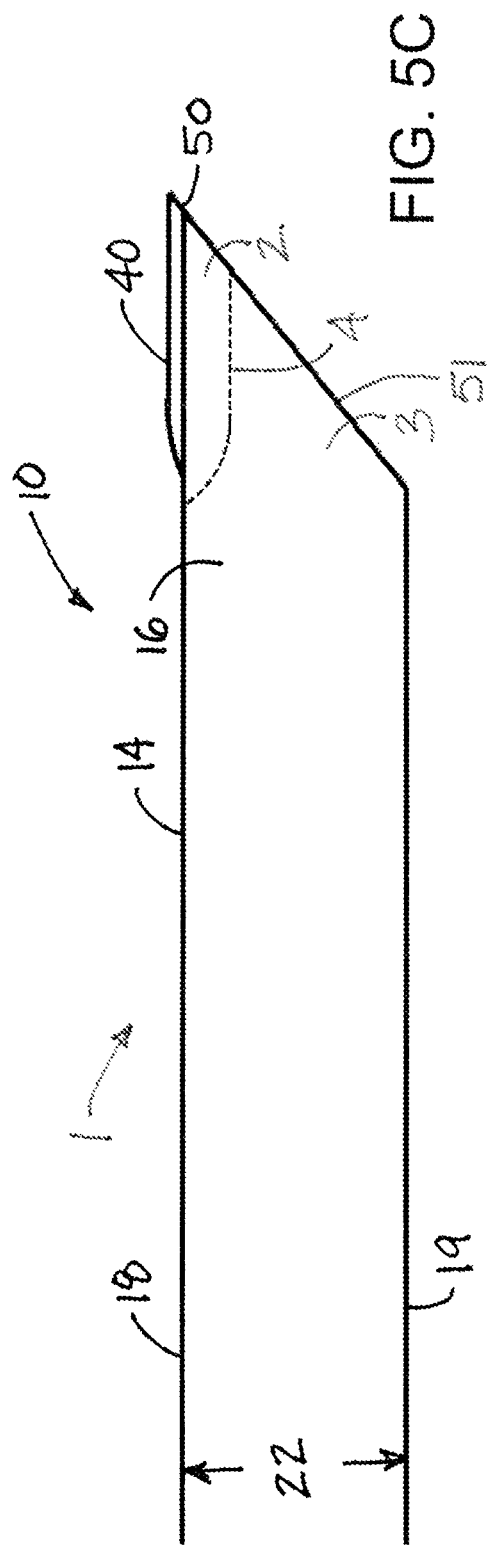
FIG. 5C is a schematic side sectional view of the cutting element formed by an implementation of a method of the disclosure and is shown in a typical condition prior to wear on the element.
Figure 5D:
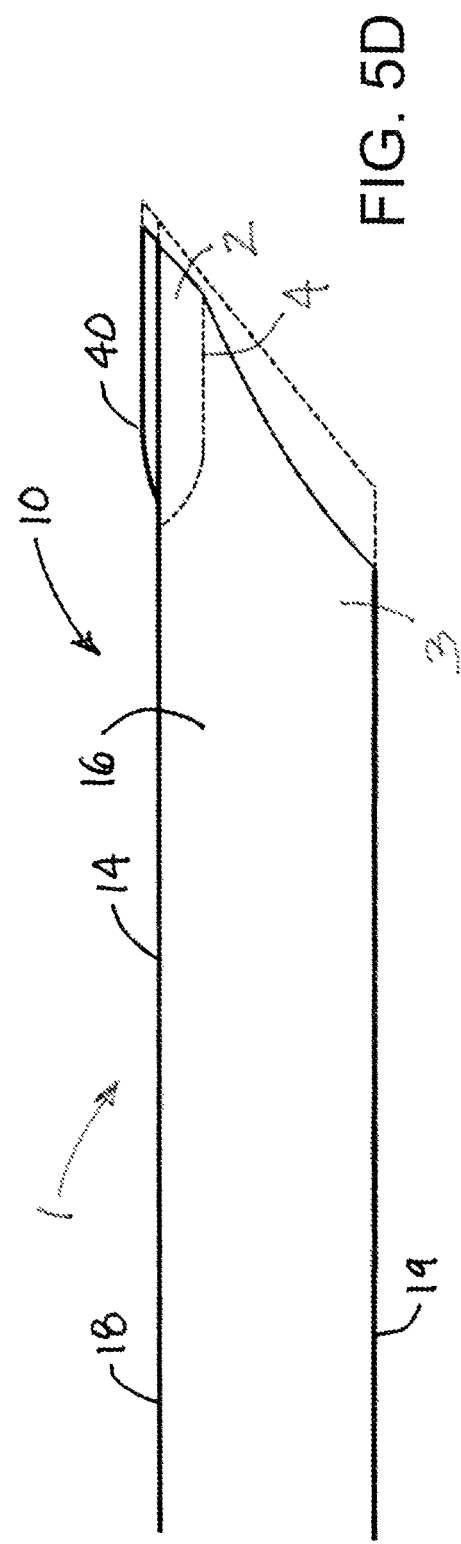
FIG. 5D is a schematic side sectional view of the cutting element formed by an implementation of a method of the disclosure and is shown in a typical condition after experiencing a degree of wear after usage of the element.
Figure 7:
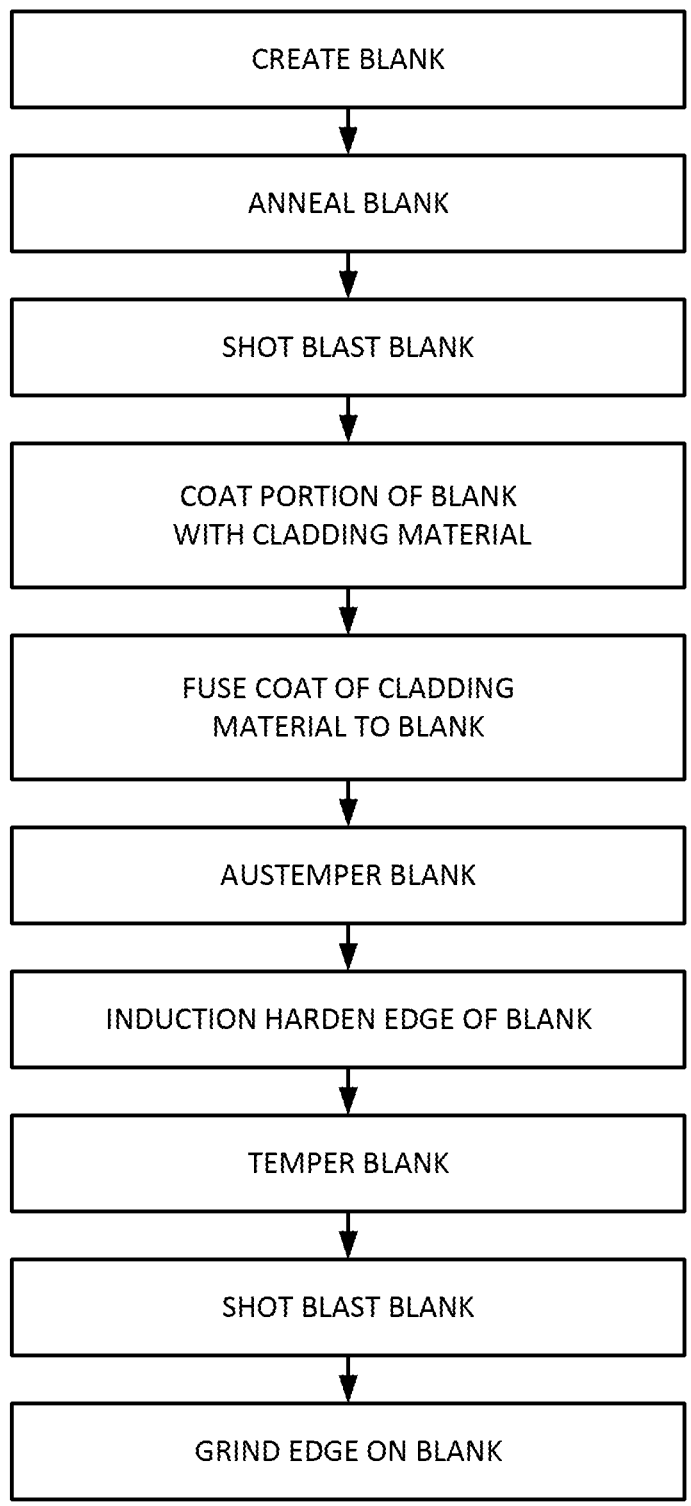
FIG. 7 is a schematic flow diagram of one previously utilized technique for forming a cutting element with the cutting edge.
Figure 8:
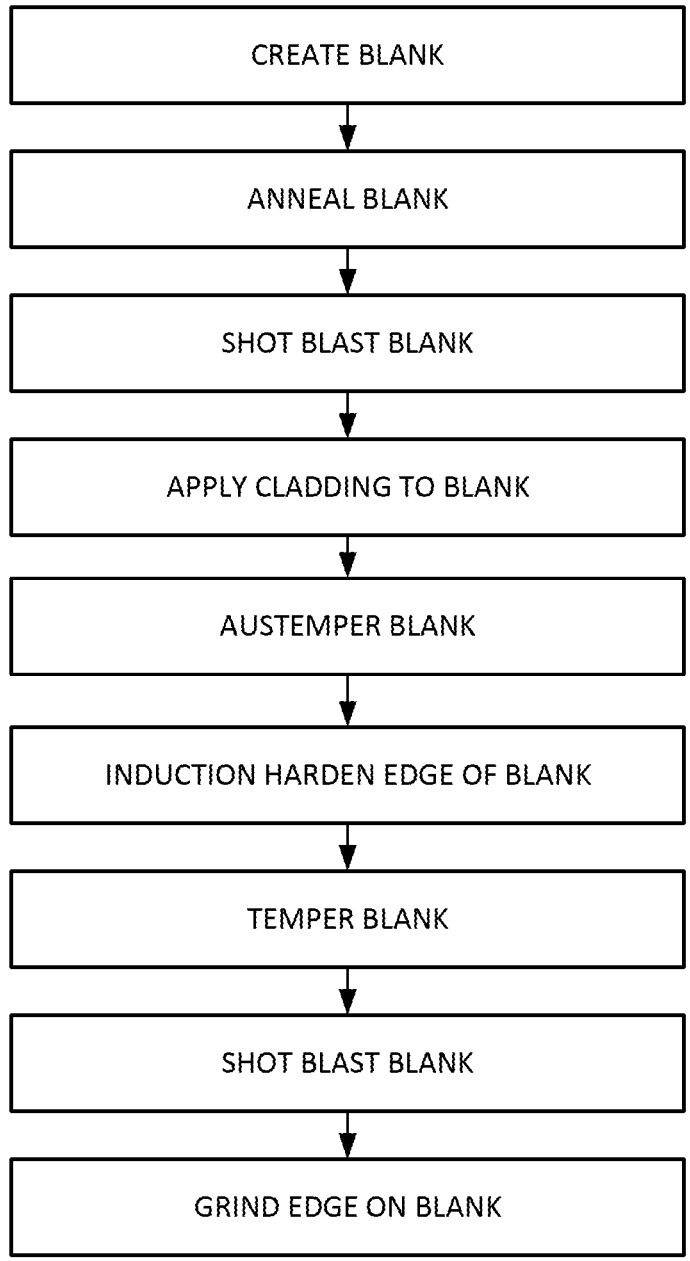
FIG. 8 is a schematic flow diagram of another previously utilized technique for forming a cutting element with the cutting edge.

A number of techniques have been used to form cutting elements with enhanced degrees of hardness and toughness. Some previously known techniques are depicted in FIG. 7, which illustrates a spray and fuse technique for applying a cladding material to a plate material blank in the context of subjecting the blank to various heat treatment steps, and also in FIG. 8 which illustrates a laser metal deposition technique for applying a cladding material to a plate material blank also in the context of subjecting the blank to various heat treatment steps. In general, these previously known techniques can be generally summarized as subjecting the material blank to coating, austempering, induction hardening, and tempering steps.

The applicants have also recognized that the previously known techniques for processing the blank of material utilized to form the cutting element to increase the hardness and toughness of the end product tend to extend a hardened region 2 of the blank of material beyond what is necessary in order to perform the cutting function and support the cladding material applied to the blank, while correspondingly decreasing a toughened region 3 of the blank (see FIGS. 6A and 6B). The extension of a boundary 4 between the hardened region 2 and the toughened region 3 beyond what is necessary for suitable wear resistance tends to increase the portion of the cutting element vulnerable to breakage and to potentially increase the likelihood of premature failure of the cutting element.

The applicants have developed techniques for forming a cutting element which integrate processes used to apply a cladding material to the blank of material with processes used to harden the blank of material that can reduce the region of the blank which has enhanced hardness characteristics and increase the region of the blank which has enhanced toughness characteristics. Thus, the region 2 with enhanced hardness may be reduced, and the region 3 with enhanced toughness may be increased (see FIGS. 5A and 5B).

The applicants have discovered that the characteristics of the cladding application process may be adjusted to not only apply the cladding material to the blank of material, but also to induce an increase in the hardness of the material forming the blank that is proximate to the cladding material on the blank. The applicants have further discovered that manipulation or variation of the characteristics of a cladding technique utilizing a laser to apply the cladding material to the blank of material can produce more precise control over the extent of the region of the blank having enhanced hardness characteristics. As a result, the hardened region may be limited to that portion which is believed to be necessary to extend the wear life of the cutting element without undue enlargement of the hardened region and compromising the toughness of the element.

Movement of the focus of the laser over the surface of the blank of material as the cladding material is applied heats a portion of the blank at the surface and adjacent to the surface which underlies the layer of cladding material, and the applicants have determined the heating effect on the material of the blank by the laser can be manipulated to produce the desired hardening of the material. For example, the energy produced by the laser and transmitted to the surface of the material of the blank and the application of the cladding material to the surface can be manipulated to control the extent to which the material of the blank is heated, and the speed or rate at which the laser is translated or moved across the surface of the material of the blank can be manipulated to control the rate at which the material cools after being heated by the laser. Thus, hardening techniques may be applied to the material of the blank in a highly focused manner that limits the hardening effect to a region of the material needed to be hardened without extending the hardened region beyond what is believed to be necessary.

Moreover, limitation of the hardness treatment to a relatively smaller region of the blank of material can reduce the possibility of distortion of the blank of material in comparison to previously utilized cladding and heat treatment processes.

Application of the techniques of this disclosure to a blank of material that has been previously heat treated for the desired bulk mechanical properties (such as, for example, austempering of the material) may produce a cutting element with a very hard, wear resistant clad cutting edge supported by a strong, martensitic steel base that is further reinforced by the surrounding tougher material.

In one aspect, the disclosure relates to a method 100 of treating material used to form a cutting element 1. In the disclosure, the illustrative cutting element 1 comprises a knife or blade which is utilized to contact and cut or sever crop materials into pieces. While the characteristics of elements produced according to techniques disclosed herein are highly useful and suitable for elements which are employed for cutting, particularly in an abrasive environment, it should be recognized that the techniques of the disclosure may be utilized in the formation and production of other types of cutting elements, as well as other elements or parts which do not necessarily perform a cutting function but benefit from minimizing the portion with increased hardness while maximizing the portion with increased toughness.

The method 100 may include providing a piece of material to produce the cutting element 1. The material of the piece may be a ferrous material, such as steel. In some suitable implementations, the steel material may have a carbon equivalency number (CEN) equal to or greater than approximately 0.45, and in some highly suitable implementations the steel material has a CEN equal to or greater than approximately 0.75. The CEN may be determined using the following calculations:

$$CEN = C + A_C \times \left( \frac{Si}{24} + \frac{Mn}{6} + \frac{Cu}{15} + \frac{Ni}{60} + \frac{Cr + Mo + Nb + V}{5} + 5B \right)$$

$$A_c = 0.75 + 0.25 \times \tanh\{20 \times (C - 0.12)\}$$

C—carbon content of metal by weight as a percentage
Si—Silicon content of metal by weight as a percentage
Mn—Manganese content of metal by weight as a percentage
Cu—Copper content of metal by weight as a percentage
Ni—Nickel content of metal by weight as a percentage
Cr—Chromium content of metal by weight as a percentage
Mo—Molybdenum content of metal by weight as a percentage
Nb—Niobium content of metal by weight as a percentage
V—Vanadium content of metal by weight as a percentage
B—Boron content of metal by weight as a percentage In addition to carbon, the steel material may include other alloying elements such as, for example, boron. One illustrative example of a suitable material for use with the disclosed techniques is AISI 4145 alloy steel, although it will be appreciated that a variety of alloy steels may be utilized within the broad characteristics outlined in this disclosure. Illustratively, the material may be provided in a plate form having relatively broad faces compared to the thickness of the material between the faces.

The method 100 may further include shaping the piece of material into a blank 10 representing a form suitable for further processing and generally corresponding to the form of the completed cutting element 1. Shaping of the piece of material may include cutting the plate material to create a perimeter 12 of the blank 10 which generally corresponds to the final form of the cutting element 1. The blank 10 may have an exterior surface 14 and a substrate 16 beneath the exterior surface. In some embodiments of the cutting element 1, the exterior surface 14 may have opposite faces 18, 19 which are generally broad faces and the thickness 22 of the blank may be defined between the opposite faces 18, 19. An edge face 20 may extend between the opposite faces 18, 19 and is generally a relatively narrow face compared to the broad faces. The blank 10 may have at least two regions, including a cutting region 32 which may be utilized for forming a cutting edge of the cutting element 1 and may be positioned along the forward perimeter portion 24. Another region of the blank 10 may comprise a base region 34 which may extend from the cutting region 32 toward the rearward perimeter portion 26.

Optionally, after shaping the piece of material into a suitable form for the blank 10, at least a portion of the blank may be annealed, and in preferred implementations substantially an entirety of the blank is subject to annealing. Formation of the blank 10 may be considered complete upon the completion of annealing of the material of the blank.

Further aspects of the method may include heat treating the blank 10 to enhance the characteristics of the material forming the blank. The heat treatment of the blank may be performed by any suitable heat treatment technique. In one example of heat treating, the blank is subjected to austempering, and in some preferred embodiments the process of austempering is conducted to achieve a hardness (HRC) measurement for the blank in the range of approximately 40 to approximately 50, although other levels of hardness may be utilized to possibly lesser effectiveness. Other techniques for heat treating the blank may include, for example, quenching and tempering the material of the blank 10, normalizing the material the blank, as well as other techniques.

In some implementations, the method 100 may include removing material from at least a portion of the exterior surface 14 of the blank 10 to clean or clear away dirt or debris or artifacts from earlier processing from the surface of the blank.

Implementations of the method 100 may also include applying a cladding material 40 to at least a portion of the blank 10. The application of the cladding material 40 may include coating the portion of the exterior surface 14 of the blank with the cladding material. The application of the cladding material may include heating the portion of the exterior surface 14 as well as a portion of the substrate 16 of the blank which underlies or is located adjacent to the portion of the surface 14. In some implementations, the heating of the material of the blank may be performed using a laser beam 42 which contacts the exterior surface at a spot 44. In some implementations, the spot 44 may have a perimeter shape on the exterior surface which is substantially rectangular, although other perimeter shapes, such as oval or circular, may also be employed. In some implementations, a substantially rectangular spot may have a width in the range of approximately 1 mm to approximately 20 mm, and a length in the range of approximately 10 mm to approximately 50 mm. Impingement of the spot 44 of the laser beam on the exterior surface 14 of the blank heats the material forming the surface 14 and a portion of the substrate 16 located adjacent to the spot 44. Movement or translation of the laser beam and the surface 14 relative to each other causes movement of the spot 44 across the exterior surface of the blank which results in heating of the material associated with the new location of the spot and cooling of the previous location of the spot.

Deposition of the cladding material may be accomplished in any suitable manner, and the form of the cladding material may be a powder which may be moved to the spot 44 on the exterior surface in any suitable manner. Illustratively, the powder of the cladding material may be blown or dropped onto the spot or locations on the exterior surface adjacent to the spot. Some illustrative suitable techniques for application of the cladding to the blank 10 include, for example, include application using a laser metal deposition (LMD) technique, application using a laser powder deposition (LPD) technique, application using a laser engineered net shaping (LENS) technique, application using a direct metal deposition (DMD) technique, and application using a direct metal laser sintering (DMLS) technique. Other existing application techniques, as well as application techniques developed in the future, may also be suitable.

Application of the cladding material to the blank may be accomplished by using a laser generated by a source of sufficient power to suitably melt and bond the cladding material to form a cladding coating of the powder particles blown or dropped or otherwise deposited on the exterior surface of the blank. The powder particles may move in a stream 46 to the surface 14 of the blank. In some implementations, lasers of suitable power may be capable of reaching a power density of at least approximately 3.7 kW/cm2 on the surface 14 of the blank, while a laser with a power density of approximately 7.5 kW/cm2 or greater may produce the most suitable results. Illustratively, a direct diode laser source is highly suitable for generating a laser beam with suitable power density.

The applicants have recognized that the focus of the laser's energy on the impingement spot 44 may be configured to produce a rapid heating of the exterior surface 14 and a portion of the substrate 16 at a location on the surface 14, and translation of the laser beam and the impingement spot away from the location may be configured to produce rapid cooling of the surface 14 as well as the substrate 16 at the location. The rate of translation of the impingement spot of the laser across the exterior surface, in combination with the level of energy or power density applied to the exterior surface, may produce a thermal cycle (e.g., from relatively cool to very hot and then cooling down) that may austenitize a layer or stratum of the material forming the surface 14 and the substrate 16 at the location on the exterior surface, and then may effectively quench, or self quench, the material at the location as the impingement spot of the laser moves away from the location to produce a stratum of martensitic microstructure in the substrate of the blank. Due to the relative quickness of the thermal cycle, the resulting martensite may be close to the maximum hardness allowed by the particular alloy composition of the blank material. The translation speed of the laser spot 44 on the exterior surface of the blank may be suitably adjusted or varied to achieve the desired material hardness characteristic as well as depth dimension in the material. Illustratively, the translation speed of the laser spot 44 may be in the range of approximately 5 mm/s to approximately 20 mm/s, with speeds in the range of approximately 8 mm/s to approximately 12 mm/s being the most typical.

Illustratively, the blank 10, or at least the cutting region of the blank, may be at a relatively cool temperature prior to the application of the cladding material 40 and the heating of the blank material associated with the impingement of the laser on the material. Illustratively, the material of the blank should be at a temperature below approximately 120 degrees F. prior to initiating the cladding application, and may be in the range of approximately 60 degrees F. to approximately 80 degrees F. In some implementations, the blank material may be at approximately 70 degrees F., or approximately room temperature.

Characteristics of the martensitic stratum in the substrate, such as the depth of the stratum into the substrate and the hardness of the material of the stratum, may be adjusted or controlled by adjusting variables such as the magnitude of the energy of the laser beam, the speed of translation of the impingement spot across the exterior surface, as well as the volume of powder introduced into the spot. Adjustment of these variables may adjust the cooling rate of the material in the stratum as well as the thickness of the cladding material on the exterior surface.

The flow rate of the cladding powder may be suitably adjusted or varied to achieve the desired to achieve a desirable thermal cycle in the blank material, while providing a suitable coating of the cladding material on the exterior surface. Illustratively, the flow rate of the powder may be in the range of approximately 5 g/s to approximately 50 g/s. Suitable for powders for the cladding material may include carbide. Illustratively, the cladding alloy powder may include approximately 60% to approximately 90% of a Period 4 transition metal of the periodic table such as cobalt, iron, or nickel. Additionally, alloying components in the range of approximately 0.1% to approximately 25% may be utilized, and may include, for example, boron, silicon, copper, chromium, carbon, tungsten, molybdenum, vanadium, titanium, zirconium, hafnium, niobium, manganese, iron (in cobalt or nickel based alloys), nickel (in cobalt or iron based alloys) singly or in combinations thereof. Additional elements may be present in trace amounts in the powder the cladding material such as sulfur or phosphorus as either contaminants or intentional additions as melting point suppressants. Reinforcing phases comprised of carbides, borides, oxides or nitrides may be added to the powder blend as a proportion of up to approximately 60% of the powder by volume. It will be recognized by those skilled in the art that other components and other compositions may also be suitable.

In some illustrative embodiments, the hardened stratum of the substrate 16 may have an HRC measurement in the range of approximately 58 to approximately 62, although HRC measurements in the range of approximately 50 to approximately 65 may be possible.

In some implementations, the thickness of the resulting stratum does not extend into the substrate a distance greater than approximately ⅓rd of the overall substrate thickness, although greater proportions of death penetration may be utilized. In some of the most preferred implementations, the thickness of the stratum should not extend into the substrate for a distance greater than approximately ⅒th of the substrate thickness. In some illustrative embodiments, the hardened stratum of the substrate 16 may have a depth below the exterior surface 14 of a depth of approximately 0.020 inches to approximately 0.060 inches.

As an example, a blank formed of AISI 4150 steel and requiring high toughness may be austempered to provide a bainitic microstructure at a hardness (HRC) of approximately 45 to provide adequate strength to not deform in use while also providing the toughness required to withstand hard impacts without fracturing.

Implementations achieving some of the most beneficial results may utilize an application of the cladding material to the portion of the exterior surface accomplished in a single translation pass without, for example, multiple translation passes in which portions of the path of the spot overlap the path of the spot on a previous translation. Multiple translation passes rastered over the area of the exterior surface on which the cladding material is to be applied may utilize overlapped translation passes in which a succeeding translation pass may produce a tempering of the martensite produced by the preceding translation pass and may thus produce, as a result, a lower than optimum or desired hardness due to the subsequent tempering.

Further processing of the blank 10 according to the method 100 may include tempering the blank. Illustratively, the tempering may establish a hardness (HRC) measurement in the range of approximately 55 to approximately 60 in the hardened cutting region 32 of the blank.

The method 100 may further include the step of removing material in order to form or further define a cutting edge 50 on the cutting element 1. Beneficially, removal of the material to form the cutting edge 50 may expose the stratum of martensite formed in the material of the blank, and the exposed stratum of martensite provides the cutting edge with the enhanced wear resistance characteristics of the martensite. The removal of material may include removing material from the cutting region of the blank, such as along the forward perimeter portion 26 of the perimeter of the blank, and may also include removal of material from the cladding material bonded to the material of the blank. The removal of material may provide a taper face 51 which extends between first 18 and second 19 opposite broad faces of the blank, as illustratively shown in FIGS. 5C. The removal of material may be accomplished in any suitable manner, including removal by machining the material of the clad blank adjacent to the forward perimeter portion 26 of the blank. One illustrative example of machining the material is grinding material away from the cladding material.

In some implementations, the blank may be presented to the process in a state of heat treatment that requires no further heat treatment once the laser cladding process is completed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A method of treating material of a cutting element, the method comprising:
    providing a piece of material to form a blank for the cutting element, the blank having an exterior surface and a substrate of the material below the exterior surface of the blank, the exterior surface including opposite first and second broad faces and an edge face extending between the first and second broad faces;
    applying a cladding material to at least a portion of the blank adjacent to an intersection of the edge face and the first broad face by utilizing a laser to bond a cladding powder to the exterior surface of the blank, a beam of the laser impinging on the exterior surface of the blank at a spot on the exterior surface, the application including:
        selecting and utilizing a power level of the laser and a rate of movement of the spot of the laser across the exterior surface which is effective to form a stratum of martensite in the substrate of the material below the exterior surface and the cladding material bonded to the exterior surface; and
    removing a portion of the blank at the edge face to provide a taper face extending between the first and second opposite broad faces and to form a cutting edge on the cutting element at an apex of an acute angle defined by the first broad face and the taper face such that a portion of the stratum of martensite is exposed at the apex of the angle forming the cutting edge and the exposed portion of the stratum of martensite extends along one of the faces forming the cutting edge and such that the cladding material is located at the apex of the acute angle of the cutting edge and extends from the apex of the acute angle along another one of the faces.

2. The method of claim 1 wherein the removing step includes removing a portion of the cladding material.

3. The method of claim 1 wherein the power level of the laser beam is effective to create, at a location on the blank, heating of the material to induce a phase change that results in a formation of the stratum of martensite in the substrate of the material below the exterior surface and the cladding material bonded to the exterior.

4. The method of claim 3 wherein the rate of movement of the spot of the laser beam across the exterior surface of the blank is effective to create, at the location on the blank, cooling of the material to quench the material at the location to create the stratum of martensite in the substrate of the material below the exterior surface and the cladding material bonded to the exterior surface.

5. The method of claim 1 additionally comprising annealing at least a portion of the blank prior to the step of applying a cladding material.

6. The method of claim 5 additionally comprising heat treating at least a portion of the blank after the step of annealing at least a portion of the blank.

7. The method of claim 6 wherein the heat treating step includes austempering the at least a portion of the blank.

8. The method of claim 1 additionally comprising austempering at least a portion of the blank prior to the step of applying a cladding material.

9. The method of claim 1 additionally comprising tempering the blank after applying the cladding material to the blank.

10. The method of claim 1 wherein the removing step includes grinding a portion of the blank to form the cutting edge.

11. The method of claim 1 wherein the cladding material is applied to the first broad face of the blank adjacent to the intersection of the edge face and the first broad face.

12. The method of claim 1 wherein the stratum of martensite is formed in a position at the intersection of the first broad face and the taper face of the blank such that the stratum of martensite extends from the apex of the acute angle along the first broad face and along the taper face.

13. The method of claim 1 wherein the removing of the portion of the blank at the edge face to provide the taper face produces a section of the applied cladding material extending beyond the taper face of the blank.

14. The method of claim 1 wherein the removing of the portion of the blank at the edge face to provide the taper face forms the taper face with a planar extent extending from the first opposite broad face to the second opposite broad face.

15. The method of claim 1 wherein each of the first and second broad faces is planar and the first and second broad faces extend parallel to each other.

16. A method of treating material of a cutting element, the method comprising:
providing a piece of material to form a blank for the cutting element, the blank having an exterior surface and a substrate of the material below the exterior surface of the blank, the exterior surface including opposite first and second broad faces and an edge face extending between the first and second broad faces, the first and second broad faces each being planar and extending substantially parallel to each other;
applying a cladding material to at least a portion of the blank utilizing a laser to bond a cladding powder to the exterior surface of the blank, a beam of the laser impinging on the exterior surface of the blank at a spot on the exterior surface, the cladding material being applied to the first broad face of the blank adjacent to the edge face, the application including:
selecting and utilizing a power level of the laser and a rate of movement of the spot of the laser across the exterior surface which is effective to form a stratum of martensite in the substrate of the material below the exterior surface and the cladding material bonded to the exterior surface; and
removing a portion of the blank at the edge face to provide a taper face extending between the first and second opposite broad faces and to form a cutting edge on the cutting element at an apex of an acute angle defined by the first broad face and the taper face such that a portion of the stratum of martensite is exposed at the apex of the angle forming the cutting edge and the exposed portion of the stratum of martensite extends along the taper face and such that the cladding material is located at the apex of the acute angle of the cutting edge and extends from the apex of the acute angle along the first broad face.

* * * * *